Patented Apr. 3, 1951  2,547,064

UNITED STATES PATENT OFFICE 2,547,064

SEPARATION OF METHYL AMINES

William Tyerman, Norton-on-Tees, England, assignor to Imperial Chemical Industries Limited, a corporation of Great Britain No Drawing. Application November 25, 1947, Serial No. 788,081. In Great Britain November 29, 1946

4 Claims. (Cl. 202—39.5)

This invention relates to methods of separating organic nitrogen compounds.

According to the present invention monomethylamine is separated as vapour from mixtures containing it and one or both of the other methyl amines by selective absorption of the other amine or amines by an organic liquid selected from the group: alkyl substituted anilines; alicyclic amines; lower aralkyl ethers; quinoline; the nitro-derivatives of aromatic hydrocarbons; hydrogenated naphthalenes; higher alkyl benzenes; terpenes; and chlorinated aromatic hydrocarbons. The preferred form of the present process is extractive distillation as hereinafter defined.

By "selective absorption" in this specification is meant a process for separating one or more substances from a mixture containing two or more substances which comprises: treating the mixture, which may be in liquid or vapour form, in counter current with an extracting liquid so as to obtain at least one of the substances as vapour and selectively absorb one or more of them in the liquid; and taking off one or more of them as vapour at a point in the system above or beyond the point of introduction of the mixture. Preferably the process is conducted in a column to which the mixture is fed and in which the treatment is effected, the mixture, preferably, being fed to the bottom of the column, the extracting liquid being fed at a point above this and the vapour being taken off from the top of the column.

By "extractive distillation" in this specification is meant a process of selective absorption which is conducted in a column and is characterised by the features that the mixture to be treated is fed to the column at an intermediate point in the column, the extracting liquid is fed at a point above this, preferably at the top of the column, the vapour is taken off from the top of the column and at least some of the more soluble substance or substances absorbed in the liquid is desorbed from the liquid at the bottom of the column or outside the column, and is again brought in contact with the extracting liquid at, or in the neighborhood of, the bottom of the column. This may be achieved, for example, by employing a boiler at the bottom of the column, and returning said substance or substances to the column as vapour, or by removing the extracting liquid from the bottom of the column, stripping from it the more soluble substance or substances in a separate still, and returning the desired proportion of said substance or substances to the bottom of the column as reflux. The proportion of the more soluble substance or substances returned as reflux will depend on the purity desired in the product, and on the relative solubilities of the individuals to be separated. Thus, where high purity is desired and/or the difference in solubility of the substances in the extracting liquid is small a high proportion of desorbed vapour will be returned as reflux. In practice the proportion to be absorbed as reflux can be readily determined by those skilled in the art.

In all these processes it is preferable that the extracting liquid should have a boiling point at the operating pressure at least 50° C. higher than the boiling point of the most soluble substance in order that the last mentioned may be readily separated from the liquid by distillation.

In all these processes, also, the mixture may be fed to the system as vapour or as liquid, in which last case the vaporisation takes place within the system, that is within the column when a column is used.

The process of extractive distillation of the present invention may be directed to the preparation of substantially pure monomethylamine, in which case it will be operated so that not all of the monomethylamine is expelled from the extracting liquid, or it may be directed to the preparation of one of the other amines, or of a mixture of these, substantially free from monomethylamine, in which case it will be operated so that the monomethylamine separated as vapour contains respectively one or both of the other amines. Both these procedures are included within the scope of the invention but the former is considered to be the more important of the two. The other amine or mixture of amines may be subsequently recovered from the extracting liquid by stripping.

Furthermore, when the mixture being treated contains the three amines, and the liquid is one in which the dimethylamine is less soluble than the trimethylamine, or vice versa, the process may be employed for the separation (as vapour) of a mixture of monomethylamine and the other least soluble amine from the most soluble amine, which remains in solution in the extracting liquid. This is of particular importance where the most soluble amine is the desired product. The desired amine can subsequently be recovered from its solution by distillation. The mixed amines taken off as vapour may be returned to the amination unit, or may, if desired, be separated by fractional distillation or selective absorption, in particular by extractive distillation. The invention is to be considered as including the method of operation described in this paragraph but does not include the process claimed in applicant's copending United States application, Serial No. 788,082, filed November 25, 1947.

The process is very valuable for separating monomethylamine from mixtures of the amines also containing ammonia. In such case it is preferred to remove the ammonia prior to the process of the present invention. However, if desired, monomethylamine and ammonia may be taken off as vapour and separated from one another, for example by selective absorption or extractive distillation with a liquid in which ammonia is less soluble than monomethylamine, which includes most organic solvents, e. g. are: aniline, the lower alkyl anilines, the mono-amines of the alkyl benzenes, the aliphatic mono-alcohols, cyclic mono-alcohols, mono-nitro derivatives of benzene and of the alkyl benzenes, hydrocarbons, chlor-substituted cyclic hydrocarbons and the formamides. When the ammonia is to be removed in a separate stage prior to the separation of monomethylamine by the process of the present invention this may be done by selective absorption or by extrative distillation with one of the last mentioned liquids.

In particular there may be employed in the process of the present invention one of the following liquids, in which the solubility of monomethylamine is less than that of the other methylamines, and for which the ratio, solubility of monomethylamine: solubility of next least soluble methylamine, measured as litres of gas per 100 mls. of liquid at 20° C., is not more than 0.71: dimethylaniline; monoethylaniline; diethylaniline; dimethylcyclohexylamine; quinoline; nitrobenzene; o-nitrotoluene; tetrahydronaphthalene; decahydronaphthalene; cymene; pinene; cedrene; o - dichlorbenzene; α - chlornaphthalene. The solubilities of the three methylamines in these liquids at 20° C. are given in the table below.

Table

| Liquid | Solubility: litres of gas/100 mls. of liquid at 20° C. | | |
| --- | --- | --- | --- |
| | mono-methyla-mine | dimethyla-mine | trimethyla-mine |
| Dimethylaniline | 6.4 | 23.0 | 14.9 |
| monoethylaniline | 11.3 | 32.4 | 22.8 |
| diethylaniline | 6.0 | 18.0 | 13.4 |
| dimethylcyclohexylamine | 6.7 | 18.7 | 18.7 |
| quinoline | 9.2 | 21.2 | 25.5 |
| anisole | 8.9 | 25.2 | 18.5 |
| nitrobenzene | 8.8 | 22.6 | 15.4 |
| o-nitrotoluene | 8.6 | 22.1 | 14.9 |
| tetrahydronaphthalene | 4.0 | 17.0 | 15.1 |
| decahydronaphthalene | 2.4 | 11.6 | 15.6 |
| cymene | 4.8 | 18.2 | 17.7 |
| pinene | 3.4 | 15.6 | 17.6 |
| cedrene | 3.4 | 10.6 | 8.6 |
| o-dichlorbenzene | 6.4 | 25.2 | 24.0 |
| α-chlornaphthalene | 5.2 | 17.4 | 13.0 |

The preferred extractive liquids are: dimethylaniline, monoethylaniline, diethylaniline, dimethylcyclohexylamine, quinoline, tetrahydronaphthalene, decahydronaphthalene, cymene, pinene, o-dichlorbenzene, alpha-chlornaphthalene, and anisole.

It is convenient to employ these liquids for the separation of monomethylamine as vapour at temperatures in the neighbourhood of 20° C., but temperatures of from about 8° C., up to about 40° C. may be employed if desired. Most frequently atmospheric pressure will be employed, but pressures above or below atmospheric may also be used. If superatmospheric pressure is used a suitable range is up to 20 atmospheres gauge.

The extractive distillation may be carried out employing columns of known type, e. g. packed, sieve-plate or bubble cap columns. Preferably the mixture containing the methylamines is introduced at an intermediate point in the column, most conveniently in vapour form. It is preferred to include in the system a presaturator of the type described in co-pending British application No. 35,879/46, applied for by W. Tyerman and F. Wrigley, filed on December 4, 1946, and issued as British Patent 630,884. The monomethylamine is obtained as vapour from the top of the column while the di- and/or tri-methylamine are obtained from the bottom of the column as a solution in the extracting liquid. The vapour, which may comprise one or more of the other methylamines is expelled from this solution by heating, a portion is returned to the bottom of the column as reflux and the remainder is taken to storage. The extracting liquid stripped from amines is cooled and returned to the pre-saturator.

Simple selective absorption as applied to the separation of monomethylamine from a mixture of the three methylamines may be conducted, for example, by scrubbing the mixture counter-currently in a column with one of the aforesaid liquids, taking off substantially pure monomethylamine from the top of the column and a solution of the three amines from the bottom of the column. The feed is introduced at the bottom of the column and no reflux is used.

I claim:

1. A process for the separation of monomethylamine from its admixtures from other methylamines, which comprises selectively absorbing at least one of the other methylamines together with at least some monomethylamine by a liquid as hereinafter defined, removing substantially pure monomethylamine as a vapor at a temperature within the range of 8° to 40° C., said liquid being an organic cyclic hydrocarbon derivative having a boiling point at the operating pressure at least 50° C. higher than the boiling point of monomethylamine, characterized by the feature that the ratio of the solubility of monomethylamine to that of the next least soluble methylamine therein, is not more than 0.4, said liquid being selected from the group consisting of tetrahydronaphthalene, cymene, pinene, cedrene, o-dichlorobenzene, alpha-chlornaphthalene and decahydronaphthalene.

2. A process for the separation of monomethylamine as set forth in claim 1, wherein a pressure of up to 20 atmospheres gauge is employed.

3. A process for the separation of monomethylamine as set forth in claim 1, wherein said selectively absorbed methylamines are recovered from the extracting liquid by stripping, the said stripped liquid being returned to the system for further extraction.

4. A process for the separation of monomethylamine as set forth in claim 1, wherein a portion of said monomethylamine obtained as a vapor is returned to the system as reflux, the remainder being utilized as product.

WILLIAM TYERMAN.

REFERENCES CITED

The following references are of record in the file of this patent:

UNITED STATES PATENTS

| Number | Name | Date |
| --- | --- | --- |
| 2,045,929 | Swallen | June 30, 1936 |
| 2,125,905 | Fenske | Aug. 9, 1938 |
| 2,357,028 | Shiras et al. | Aug. 28, 1948 |

OTHER REFERENCES

Herold et al.: 36 Chemical Abstracts 786,